United States Patent Office 3,734,897
Patented May 22, 1973

3,734,897
POLYMERS CONTAINING SILVER AND COPPER DERIVED FROM CYANO AND SULFONIC CONTAINING MONOMERS
Arthur Stoy, Prague, Czechoslovakia, assignor to Ceskoslovenska Akademie ved, Prague, Czechoslovakia
No Drawing. Continuation of abandoned application Ser. No. 729,897, May 17, 1968. This application Feb. 9, 1971, Ser. No. 114,088
Int. Cl. C08f $13/00$; C12g $1/00$; G03c $1/86$
U.S. Cl. 260—79.3 MU  8 Claims

ABSTRACT OF THE DISCLOSURE

New polymers and copolymers containing silver and/or copper, useful e.g. in manufacturing dialyse and filtration membranes, ion exchangers, light sensitive layers, catalysts and hydrophilic coatings, are prepared from copolymers or polymer mixtures containing both nitrile groups and strong acidic groups, by bringing them in contact with monovalent silver or copper ions or with their mixtures. Silver and/or copper are attached to nitrile groups by side valences, forming thus complex compounds. The probable formulae of the complex side-groups are: $-CN.Ag^+$ or perhaps $-CN.Ag^+.NC-$ and $-CN.Cu^+$ or perhaps $-CN.Cu^+.Cu^+.NC-$, the complex cations forming polymeric salts with strong acidic groups of the same or of an adjoining macromolecule, to which all said nitrile and strongly acidic groups are attached as their side substituents.

---

This application is a continuation of Ser. No. 729,897 filed May 17, 1968, now abandoned.

Polymers and copolymers forming starting materials for the new complex polymeric compounds, are mainly derived from acrylonitrile or methacrylonitrile on the one hand and from ethylene sulfonic or styrene sulfonic acid on the other, said monomers forming either copolymers or mixtures of homopolymers.

Copolymers of this kind were known. It was not known, however, that they can form complex compounds with silver and monovalent copper having new and in many respects outstanding properties. There were known only chelates of silver and copper ions with polymers having iminodiacetic groups (so called IDE-resins, see e.g. R. Hering, Chelatbildende Ionenaustauscher, Akademie-Verlag Berlin 1967, p. 91–93).

There was also known a method of dyeing polyacrylonitrile fibres with acid dyestuffs in presence of monovalent copper salts-"sandocryl" and other processes. In said processes, the strongly acidic groups were attached to dyestuff molecules only, not to macromolecules of the same or other polymer. Complex-bound dyestuff molecules were concentrated mainly near the surface of the fibre and the properties of the fibre remained unchanged except the color. Although the said dyeing method was known for many years, there was no hint in the art how to use the affinity of cuprous ions to nitrile groups for other purposes than dyeing. The possibility of using silver ions for modifying polymers having nitrile groups was apparently not studied at all.

Although any polymer or copolymer having nitrile side groups may be used for the purpose of the invention, e.g. methacrylonitrile or vinylidencyanide polymers, acrylonitrile polymers and copolymers are preferred since they are more accessible, less expensive and more strong and stable than others. From strongly acidic groups the sulfonic groups are preferred from similar reasons, although they can be replaced by acid sulfuric ester groups $-O.SO_3H$ or by phosphoric ester groups such as $-O.PO_3H_2$, if desired. Generally, all strongly acidic groups as used in ion exchangers may be employed for the purpose of the invention, but sulfonic acid groups, attached to a carbon atom of either the main chain or a side group, appear to be most useful at the present time.

The reaction between monovalent silver or copper ions and polymeric systems containing nitrile and strongly acidic groups takes place preferably in aqueous media, but it is generally possible to use any medium in which said polymeric systems either swell or dissolve, and in which said metal cations can exist in sufficient concentrations. Like other ionic reactions, the forming of the present complex compounds is rapid, provided that the polymeric system is either dissolved or highly swollen so that the diffusion of metal ions is not seriously hindered.

As polymeric systems containing both nitrile and strongly acid groups either copolymers can be employed, having groups of the two kinds on the same macromolecule, or also mixtures of polymers, each polymer containing groups of one kind only, or, at least, groups of one said kind in prevailing amount. Thus, also mixtures of different copolymers can be employed. Moreover, the copolymers may contain also other monomer units such as acrylamide or methacrylamide units, such units securing both higher solubility and possibility of cross-linking with covalent bonds by means of bifunctional compounds capable of reacting with amidic side-groups.

As mixtures of homopolymers, e.g. a mixture of polyacrylonitrile and polystyrene sulfonic or polyethylene sulfonic acid or their salts respectively in a common solvent such as in concentrated nitric acid can be used.

If copolymers are formed, particularly for special uses, acrylonitrile on the one side and sodium salt of either ethylene sulfonic acid (vinylsulfonic acid) or styrene sulfonic acid are the preferred monomers. The copolymerization is to be carried out in solvents dissolving all monomers present. It is also advantageous, in some cases, although not unavoidable to use solvents dissolving not only monomers, but also the copolymer thus formed. Such common solvents for both monomers and copolymer are e.g. concentrated aqueous solutions of certain salts, particularly zinc chloride, or aqueous dimethylformamide. If the share of the acidic monomer prevails, it is possible to use water as common solvent. In this way, a rather concentrated aqueous copolymer solution, suitable for further treatment, can be obtained immediately by copolymerization. Economic advantages of water as both polymerization medium and copolymer solvent are obvious. Other advantage is very low transfer constant of water, yielding higher average molecular weight. Another advantage of water is the possibility of using redox polymerization catalysts or initiators, allowing copolymerization at comparatively low temperatures, whereby the chain transfer onto the monomers and copolymer is slowed down. Concentrated aqueous zinc chloride solutions possess also the two last mentioned advantages, but zinc ions are very difficult to be removed, not mentioning the economy.

Aqueous dimethylformamide or dimethylsulfoxide solutions have the disadvantage of a comparatively high chain transfer constant, but this can be partly avoided by using redox catalysts and low temperatures. Generally, the average molecular weight of copolymers prepared in said solvents is comparatively low. Nevertheless, said solvents are very useful if the monomer, bearing nitrile groups, prevails.

Ionic bonds between cationic nitrile-silver or nitrile-copper groups and strong acidic groups particularly the intermolecular ones, cause ionic cross-linking. Moreover, the reaction of nitrile groups with silver or copper ions and the formation of polymeric inner salts manifests itself by considerable shrinking of the swollen copolymer.

As a result, the strength of the swollen copolymer increases. Since, however, ionic cross-links can be broken and then restituted without necessity of an activation energy, they do not hinder, in contradistinction to covalent cross-links, molecular orientation by stretching. This circumstance is important since copolymers with many strongly acidic groups swell considerably in water, whereby their tenacity is impaired. Thus, they cannot be stretched in swollen condition. In dry condition they are brittle and cannot be stretched as well except at rather high temperatures. If treated with silver or monovalent copper ions, such copolymers can be easily stretched in wet condition, whereby their strength and size stability are enhanced. It is, however, possible to remove silver or copper ions after the stretching and restitute in this way the starting copolymer in a state of high molecular orientation, e.g. in the form of a membrane or fibre. Surprisingly, the orientation is at least partly maintained together with improved properties, mainly the size stability at different ionic concentrations. In other words, the linear swelling and shrinking of the copolymers is substantially reduced.

Silver containing polymeric compounds according to the invention are light-sensitive and can be used either directly or after having been reacted with halogenide ions in photography, picture printing and related industries.

New silver- or copper containing polymer compounds can be also employed for special coatings, particularly for ships and other articles immersed permanently in water. They are smooth and resisting to many undesired organisms.

Polymeric systems (copolymers or polymer mixtures) with both nitrile and strong acid groups are able to catch silver and/or cuprous ions even from very diluted solutions, such as from different waste waters. Thus, such waste waters can be utilized for preparing the metal containing polymers according to the invention, which are simultaneously utilized for gaining said metals from waste liquors which are otherwise drained. Silver ions are caught quantitatively.

In the form of membranes, grains or fibres the new silver and/or copper containing polymers can be employed for filtration, as ion exchangers, catalysts, means for artificial aging of spirits, wine and other beverages etc.

With prevailing acidic groups the new polymers can be used as cation exchangers. With prevailing nitrile groups, they have properties of anion exchangers.

Other fields of use are dialysis, electrodialysis, fuel cells and other.

Membranes from the new polymers, when used for filtering aqueous solutions, reject large molecules and particles without being blocked thereby. Small molecules such as water or small ions can penetrate through such membranes. If there are no large molecules or particles present which could choke up pores, it is possible to use membranes or other forms of the new polymers with visible porosity or macroporosity. Besides of known methods for obtaining porous structure, it is possible to obtain porous membranes also by casting polymer solutions with solvents consisting at least partly of low volatile liquids such as dimethylformamide, and evaporate the solvent but incompletely. Such membrane is apparently almost dry, but when washed in water it becomes porous as the low volatile solvent is rapidly dissolved and the very viscous solution coagulated. Instead of water the still partly wet membrane can be washed in any other solvent capable of dissolving the remaining true solvent but incapable to dissolve the polymer. By reacting such porous membranes with silver or cuprous ions one obtains large surface structures, very effective e.g. as catalysts or for dialysis of clear solutions.

Polymers and copolymers used as starting material containing strong acid groups swell in water and aqueous solutions, and partly also in some polar solvents like methanol, dimethylformamid etc. With large content of strong acid groups the copolymers are water-soluble. Linear copolymers having so high a content of nitrile groups that they are no more water-soluble can be dissolved in aqueous solvent mixtures, e.g. in a dimethylformamide—water or dimethylsulfoxide—water mixture. The swelling capacity of copolymers decreases with decreasing amount of strong acid groups.

Silver and copper are in polymer complexes according to the invention comparatively strongly bound: E.g. silver cannot be removed with a 20% nitric acid. Silver is bound more firmly than copper: Silver complex is not decomposed by 20% aqueous ammonia, while copper complex forms therewith the known dark blue complex solution. This depends, of course, also on the reactivity of the reagents with respect to each of the two metals.

By means of strong reducing agents the two metals are eliminated as such, forming a dispersion in the polymer. They can then be dissolved e.g. in mineral acids—nitric for silver or hydrochloric for copper. Polymeric silver complexes react with halide ions, forming insoluble silver halides, finely dispersed in the swollen polymer. The grain size of the silver halides can be increased or decreased by maintaining the polymer in swollen condition for an extended period of time, if desired in presence of known peptizing agents, as known in the manufacture of photographic light-sensitive material. In order to increase the light sensitivity, some gelatine solution can be added to the polymer solution before casting and treating with silver and halide ions. Usual sensitizers can be added as well.

Copolymers of acrylonitrile or methacrylonitile with ethylene sulfonic or styrene sulfonic acid or with their soluble salts respectively are in many respects similar to native gelatine, particularly if acrylamide or methacrylamide is added as third monomer. The possibility of adjusting their properties by choosing suitable ratio between the monomers as well as that of subsequent hardening by means of formaldehyde or similar, is very desirable. Highly uniform light sensitive layers can be produced by coating paper, glass, plastic films or foils with said copolymers, treating them with silver ions, removing excess thereof, and treating them again with halide ions. Preferably, after removing excessive halide solution, the material is then treated again with silver ions, washed, and dried so that the light sensitive layer is composed from a silver halide dispersed in the silver polymer complex.

Membranes can be manufactured not only by casting, as disclosed above, but also by extruding a viscous solution of a copolymer or polymer mixture, having both nitrile and strong acid groups, into a coagulating bath containing silver or cuprous ions. The same method is also suitable for fibres. Membranes or fibres leaving the coagulating (spinning) bath are then thoroughly washed and stretched, in order to obtain planar or linear molecular orientation.

Any of the methods mentioned above can be used also for manufacturing compound or bipolar membranes, consisting of two inseparable layers, one of them having prevailing amount of nitrile groups and the other an excess of strong acid groups. If such compound membranes are treated with silver or cuprous ions, they display different electrochemical properties on both sides.

The invention will be further illustrated by following non-limiting examples.

EXAMPLE 1

Concentrated aqueous zinc chloride solution ($d=1.95$) was gradually added to 2 mols of acrylonitrile and 1 mol of sodium ethylenesulfonate (the latter in the form of a 50% aqueous solution), until the two monomers were uniformly dissolved. A redox polymerization catalyst was then added in the form of 5 percent aqueous solutions of potassium pyrosulfite and ammonium persulfate (0.1% of each, on the total weight of the monomers). Finally, 0.0001% of copper sulfate-pentahydrate (in the form of an 0.1% aqueous solution) was added as polymerization activator. The somewhat turbid solution was left to polymerize under carbon dioxide at room temperature. Next day the viscous copolymer solution thus obtained was poured in a thin stream in excessive, vigorously stirred water containing 0.2% of hydrochloric acid. The fibrous, highly swollen coagulate was then repeatedly washed in 0.5% nitric acid, and water. Excess of water was removed by filtering under suction and the highly swollen copolymer was mixed, without being dried, with threefold volume of dimethylformamide. After three hours of stirring at 60° C. the almost clear solution was filtered. It contained about 5% of the copolymer. The still hot solution was degasified by applying a vacuum and poured on an exactly horizontal polished plate glass in a 2 mm. thick layer. By slow evaporating the solvents a hard, clear membrane was obtained which could be easily removed from the glass when moistened with water. The membrane was repeatedly washed in 0.5% nitric acid, in water, in a 1% aqueous solution of disodium salt of ethylenediamine tetra-acetic acid and again in water. Finally, the pure membrane was immersed into a 0.2 N silver nitrate solution. The membrane shrank thereby and became opaque and greyish white. After washing out the excess of silver nitrate the membrane, having increased tenacity, could be used e.g. for filtering or dialysis. It could be easily cold-stretched, whereby its tenacity was further increased.

Silver could be removed from the membrane in an aqueous solution of sodium thiosulfate. The membrane was then more swellable than prior to the removal of silver, but considerably less swellable than the raw unoriented membrane. The difference of length caused by shrinking in 0.1 N nitric acid and swelling in pure water, which was 150—215% in the case of the unoriented membrane, decreased to about 10% after the reaction with silver nitrate and to about 20–40% after the orientation and removal of silver.

EXAMPLE 2

Between two pieces of plates glass a sling of steel wire 0.8 mm. was firmly held and three sides were immersed for a second into a melt of bee-wax and stearine (1:1). After a little while the wax mixture solidified and a flat mold, opened on one side, was obtained, having 0.8 mm. thickness. The mold was filled with a 10° C. cool monomer mixture through a flat funnel made from polyethylene foil. Monomer mixture consisted of 10 ml. of 50% aqueous solution of sodium ethylene sulfonate, 4 ml. of acrylonitrile, one drop of ethylene glycol bis-methacrylate and 8 ml. concentrated aqueous zinc chloride solution ($d$=1.98). Immediately prior to the casting the mixture was initiated with 5 drops of a 5% potassium pyrosulfite aqueous solution and with same amount of ammonium persulfate. Gas bubbles were removed by patting on the mold. The mold was then left standing at 15° C. temperature. Gel point was reached in about 20 minutes, after 3 hours the copolymerization was finished. The wax layer on the border was cut and the mold carefully opened under water. The copolymer foil thus obtained, first highly plastified with zinc chloride soltuion, was then washed alternately in 0.5% nitric acid, water, 5% ctiric acid and again in water. Last it was immersed into a 5% silver nitrate solution and then washed again. The membrane thus obtained had similar properties like that in Example 1, except that it was less extensible and more elastic, due to the low cross-linking caused by the small amount of glycol bis-methacrylate added.

EXAMPLE 3

A 10% copper sulfate solution was reduced with hydroxylamine sulfate and powdery copper was added. A membrane prepared according to Example 2 was immersed into the solution thus obtained, containing cuprous ions. After 3 hours the membrane was washed in water. It was substantially tougher and stronger than before, and the swelling capacity was decreased similarly as when treated with silver ions. The membrane had a weakly greenish color which did not disappear by protracted washing in water.

EXAMPLE 4

Water-soluble copolymer of acrylonitrile, acrylamide and ethylene sulfonic acid was prepared in following way: 57.5 g. of a 47% aqueous solution of sodium ethylene sulfonate, stabilized against polymerization by 0.2% sodium nitrite, was destabilized by adding 3 g. urea and acidified with concentrated hydrochloric acid to pH 2. Liberated gases were repeatedly sucked off. 7.1 g. acrylamide and 13.6 ml. acrylonitrile were added and the whole was dissolved in 76 ml. of oxygen-free water. 1 ml. of a 5% sodium pyrosulfite solution and the same amount of ammonium persulfate was stirred in and the somewhat turbid solution was left standing under carbon dioxide at room temperature for 24 hours. The viscous solution thus obtained was poured in two liters of anhydrous ethanol. The white coagulate was reprecipitated by dissolving in water again and precipitating in anhydrous ethanol, broken to small pieces and dried at 70° C.

A 20% solution of the copolymer in water was cast on a horizontal plate glass and the solvent slowly evaporated. The dry layer was treated with 37% aqueous formaldehyde solution, acidified with 0.2% hydrochloric acid, for 2 hours at room temperature. The formaldehyde solution was then removed, the membrane washed with water, in which it became insoluble as a result of cross-linking with formaldehyde, and cut to two pieces. One was left in water as control, the other treated 5 minutes in a 5% silver nitrate solution and washed. The silver nitrate treated membrane shrank considerably, was opaque and its strength increased.

EXAMPLE 5

Free polyethylene sulfonic acid, obtained by treating neutral sodium polyethylene sulfonate solution in a column filled with a strongly acid cation exchanger, was mixed with an equivalent amount of silver nitrate. The solution was precipitated with a 5% solution of polyacrylonitrile in dimethylformamide. The precipitate—a polymeric salt of polyethylene sulfonic acid with a polyacrylonitrile-silver-complex polycation—is, in wet condition, a soft, greyish white plastic which can be mechanically shaped and at least partly oriented. In dry condition the mass is hard and brittle; it can be ground to a powder which can be mixed with plastifiers and molded at increased temperatures.

Similar plastic is obtained when using monovalent copper ions instead of silver.

EXAMPLE 6

Dry powdered polyacrylonitrile was dissolved in a known manner in concentrated cold nitric acid (65 weight percent) at 10–15° C. An 8% solution was obtained. Dry sodium salt of polyethylene sulfonic acid was also dissolved in concentrated nitric acid and to the 10% solution thus obtained the equivalent of silver nitrate in normal solution was added. When mixing the two clear solutions a white precipitate is formed which possesses, after having been thoroughly washed in water, similar properties as the product obtained according to Example 5.

EXAMPLE 7

Membrane prepared according to Example 1 was immersed after having been treated with silver nitrate solution and washed, into a 5% ammoniacal solution of hydrazine sulfate. It turned brownish black due to precipitated metallic silver. During the subsequent washing with water the membrane swelled considerably since the silver complex with nitrile groups was decomposed. By treating the membrane again in a 1% silver nitrate solution for 1 hour the membrane shrank again and lost its high swelling capacity. The membrane was suitable for filtering water, wine and other beverage under simultaneous sterilization and artificial ageing. Without second treatment with silver nitrate the polymer had very low oligodynamic activity since silver ions, liberated by metallic silver, are readily caught by free nitrile and sulfonic groups.

EXAMPLE 8

The copolymer solution prepared according to Example 1 in aqueous dimethylformamide was concentrated by evaporation to 11% dry substance, filtered, degasified and spun through a spinneret with 0.2 mm. holes into a spinning bath containing 5% of silver nitrate. The filaments were washed in hot distilled water and stretched. Then they were cut to staple fibres. Metallic silver was liberated according to Example 7 and the washed fibres were treated with silver nitrate again and washed. They were very suitable for filtering and to other purposes mentioned in foregoing example.

EXAMPLE 9

The process according to Example 6 was repeated using polystyrene sulfonic acid instead of polyethylene sulfonic acid. Polystyrene sulfonic acid was obtained by careful sulfonation of linear polystyrene with sulfuric acid, using silver sulfate as catalyst. Concentrated nitric acid must be carefully cooled when dissolving polystyrene sulfonic acid therein, in order to avoid excessive nitration. The greyish white precipitate had similar properties like that gained in Example 6 or 5.

EXAMPLE 10

A 10% polyacrylonitrile solution (average molecular weight 55,000) in cool concentrated nitric acid was mixed with a 10% solution of sodium polyethylene sulfonate in the same solvent. The clear solution was extruded through a slit into a 10% aqueous silver nitrate solution. The polymer solution coagulated to a white opaque membrane which could be calendered in wet condition. It was suitable for filtering under pressure.

EXAMPLE 11

A flask with even edge was filled with a silver acetate solution and tightly covered with a 0.5 mm. thick foil of regenerated cellulose. Then it was turned down and immersed with the foil into a solution of a copolymer of acrylonitrile with sodium ethylene sulfonate (molar ratio 1.5:1) in aqueous dimethylformamide. Penetrating silver ions coagulated the copolymer solution forming thus a porous membrane. The nature of the product could be changed by changing concentration of the silver nitrate solution, temperature, thickness and permeability of the foil and concentration of the copolymer solution.

EXAMPLE 12

Copolymer solution in aqueous dimethylformamide, prepared according to Example 1, was concentrated by evaporation to 11% of dry substance and used, still warm, for coating blank photographic paper. The coated paper was treated, actinic light excluded, 10 minutes with a 5% aqueous silver nitrate solution and then thoroughly washed in distilled water, and dried. When exposed to actinic light under a negative (about 5 minutes disperse daylight), the paper could be developed with usual developing agents and fixed with a sodium thiosulfate solution. The picture was violet brown.

EXAMPLE 13

The paper prepared according to Example 12 was, after having been silvered and washed, treated with 0.1 N potassium bromide solution, containing also 1% of potassium chloride and 0.1% potassium iodide on the total weight of halides. The paper was then kept for 1 hour at 30° C. in a sodium hydrocarbonate solution at pH 7.5–8. The washed and dried paper had higher light sensitivity than that according to Example 12.

EXAMPLE 14

The process according to Example 13 was repeated with the difference that a copolymer with increased swelling capacity (sulphur content 7%), containing 5 molar percent of acrylamide was used. 5% gelatin (on the weight of the copolymer) was added in the form of a warm aqueous solution prior to coating the paper. The paper was dried and hardened with gaseous formaldehyde, washed, treated with a 5% silver nitrate solution, washed again, treated with halide solution like in Example 13, washed in water, treated once again with a 5% silver nitrate solution, thoroughly washed and dried. It had still higher light sensitivity than that prepared according to Example 13.

EXAMPLE 15

The raw membrane prepared according to Example 1, yet containing neither silver nor monovalent copper, was cut to small strips and used for filling a small laboratory column, through which a very diluted (about 0.003%) silver nitrate solution—waste water from washing fibres according to Example 8—was let through. By utilizing 80% of the theoretical capacity silver was quantitatively fixed. Theoretical capacity in this case means equivalent to that active groups (either nitrile or sulfo), which are present in minor amount with respect to the other group.

EXAMPLE 16

A complex base, containing complex cations —$CN.Ag^+$ or —$CN.Cu^+$, which cations are neutralized by anions of simple mineral acids such as $NO_3^-$, can be also prepared separately and then reacted with another polymer bearing strongly acidic groups such as —$SO_3$.

Polyacrylonitrile (average molecular weight 55,000) was dissolved in concentrated nitric acid (65% $HNO_3$, 15° C.) to a 10% solution. The solution was extruded through a 0.4 mm. hole into a stirred 10% solution of silver nitrate in concentrated nitric acid. The precipitate, containing complex cations —$CN.Ag^+$ on the polymeric chain and free anions $NO_3^-$, was washed in water to neutrality. It formed a greyish white plastic which was hot-calendered to a 0.5 mm. thick sheet. Onto this sheet, a solution of acrylonitrile-ethylene sulfonic acid copolymer, insoluble in water but soluble in aqueous dimethylformamide and dissolved therein, was poured in an uniformly thick layer and evaporated. The two layers were firmly bound by ionic cross-links between complex silver cations and sulfonic groups. The bipolar membrane thus obtained could be used for building the oxygen side of a fuel cell. For this purpose, it is desirable to reduce silver complex cations first formed with an effective reducing agent such as hydrazine hydrate and then reconstitute the complex silver cations by treating the polymer again with silver nitrate or silver acetate solution as described in Example 7.

Free complex base can be obtained by washing the first prepared nitrate (see above) with diluted aqueous ammonia.

I claim:

1. A method for preparing a polymeric composition having bound thereto a monovalent metal cation of copper or silver comprising the steps of contacting a copolymer of an ethylenically unsaturated sulfonic acid or salt thereof and a monomer selected from the group consisting of acrylonitrile, methacrylonitrile, vinylidene cyanide and mixtures thereof with an aqueous solution of a salt of said metal for a period of time sufficient to form a complex between the bound metal ions and said polymeric composition.

2. A method according to claim 1 further comprising adding a reducing agent to said complex, said reducing agent being capable of reducing said complexed metal cations to the elemental state and dispersing same in said composition, thereafter applying a solution of said metal cations to said composition to thereby reform said complex.

3. The method according to claim 1, wherein the number of monovalent cations is in excess of the available monomers.

4. The method according to claim 1, wherein said copolymerization is performed under free radical polymerization in the presence of redox initiators containing less than 0.1% of metal bearing cations.

5. The method accordng to claim 1, wherein said composition is immersed in the solution so that said solution contacts each surface of said composition.

6. The method according to claim 1, including the step of applying to said complex compound a reducing agent until said bound metal ions are reduced to the elementary state and dispersed in the polymeric composition and then after applying to said composition having the elementary metal dispersed therein, said solution of ions of monovalent silver or copper until said complex compound is again formed.

7. The method according to claim 2, wherein said metal cations are silver ions, and said complex compound is contacted with halide ions until a portion of the bound metal cations is converted to silver halide insoluble in water dispersed in the surface of said composition.

8. The method according to claim 7, wherein said surface having said silver halide dispersed therein is contacted with ions of monovalent silver or copper until said complex is reformed.

References Cited
UNITED STATES PATENTS

| | | | |
|---|---|---|---|
| 3,056,169 | 10/1962 | Hendricks | 18—57 |
| 3,296,234 | 1/1967 | Ehrig | 260—88.7 |
| 3,322,734 | 5/1967 | Rees | 260—79.3 |
| 3,328,333 | 6/1967 | Dannelly | 260—30.4 |

JOSEPH L. SCHOFER, Primary Examiner

C. A. HENDERSON, Jr., Assistant Examiner

U.S. Cl. X.R.

96—85, 96, 108; 99—35, 48; 117—132, 138.8; 136—86 F, 146; 204—130; 210—500